(12) United States Patent
Burke et al.

(10) Patent No.: US 7,735,524 B2
(45) Date of Patent: Jun. 15, 2010

(54) HOSE

(75) Inventors: Raymond Nicholas Burke, Benoordenhout (NL); Eric Joseph Davis, Wirral (GB); Gerard Anthony Hall, Little Sutton (GB); Matthew Vernon Ridolfi, Elwood (AU); Simon Peter Alexander Thorp, Woodside Park (GB); Joel Aron Witz, Newdigate (GB); David Charles Cox, Surrey (GB); Richard James Anthony Smith, Brook Green (GB); Anthony James Wort, Loughton (GB)

(73) Assignee: BHP Billiton Petroleum Pty Ltd, Melbourne, Victoria (AU)

( * ) Notice: Subject to any disclaimer, the term of this patent is extended or adjusted under 35 U.S.C. 154(b) by 1200 days.

(21) Appl. No.: 10/534,557

(22) PCT Filed: Nov. 11, 2003

(86) PCT No.: PCT/GB03/04932

§ 371 (c)(1),
(2), (4) Date: Jan. 3, 2006

(87) PCT Pub. No.: WO2004/044472

PCT Pub. Date: May 27, 2004

(65) Prior Publication Data

US 2006/0124189 A1    Jun. 15, 2006

(30) Foreign Application Priority Data

Nov. 11, 2002    (GB) .................................. 0226271.5

(51) Int. Cl.
*F16L 11/00* (2006.01)
(52) U.S. Cl. .................... 138/135; 138/129; 138/133; 138/172; 138/138
(58) Field of Classification Search ................. 138/127, 138/132–134, 138, 172, 174
See application file for complete search history.

(56) References Cited

U.S. PATENT DOCUMENTS

| 1,607,909 | A | * | 11/1926 | Oden ......................... 138/122 |
| 1,785,345 | A | * | 12/1930 | Hasemann ................... 464/174 |
| 1,810,032 | A | * | 6/1931 | Schulthess .................. 138/131 |
| 1,980,466 | A | * | 11/1934 | Angeja ..................... 285/222.3 |
| 2,011,781 | A | * | 8/1935 | Tabozzi ...................... 138/131 |
| 2,661,026 | A | * | 12/1953 | Schulthess .................. 138/131 |
| 2,706,494 | A | * | 4/1955 | Morse ........................ 138/131 |
| 4,377,186 | A |   | 3/1983 | Génini et al. |
| 6,110,550 | A | * | 8/2000 | Jarrin et al. ............. 428/36.91 |

FOREIGN PATENT DOCUMENTS

JP            1283494 A      11/1989

* cited by examiner

*Primary Examiner*—Patrick F Brinson
(74) *Attorney, Agent, or Firm*—Rankin, Hill & Clark LLP

(57) ABSTRACT

A hose (10) comprising a tubular body (12) of flexible material arranged between an inner and an outer helically wound wire (22, 24). The hose (10) further comprises an elongate member having opposing longitudinal edges, the elongate member being helically wound around the tubular body such that the opposing longitudinal edges of the layer are in an adjacent or overlapping arrangement, wherein each longitudinal edge includes a formation capable of interengaging with a cooperating formation on the opposing longitudinal edge.

20 Claims, 6 Drawing Sheets

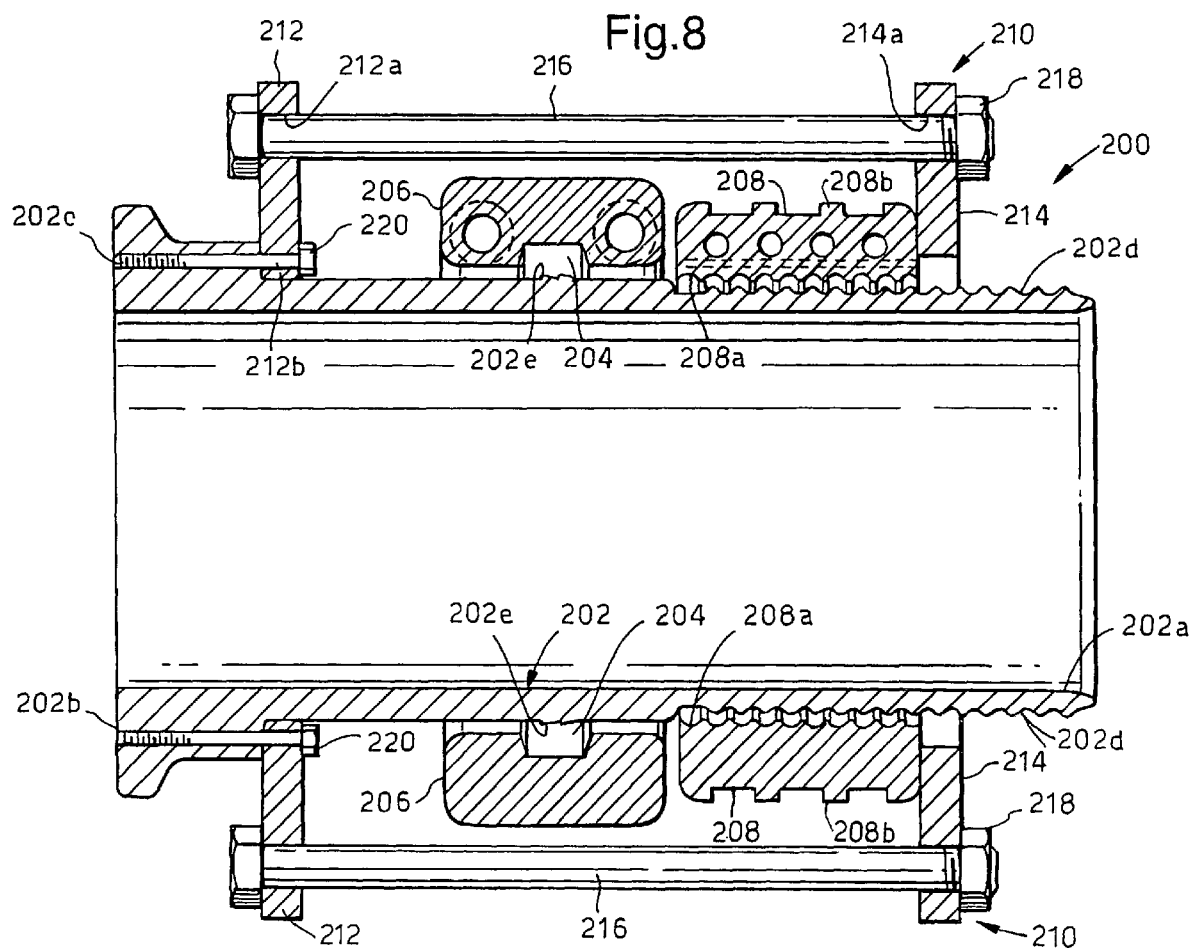

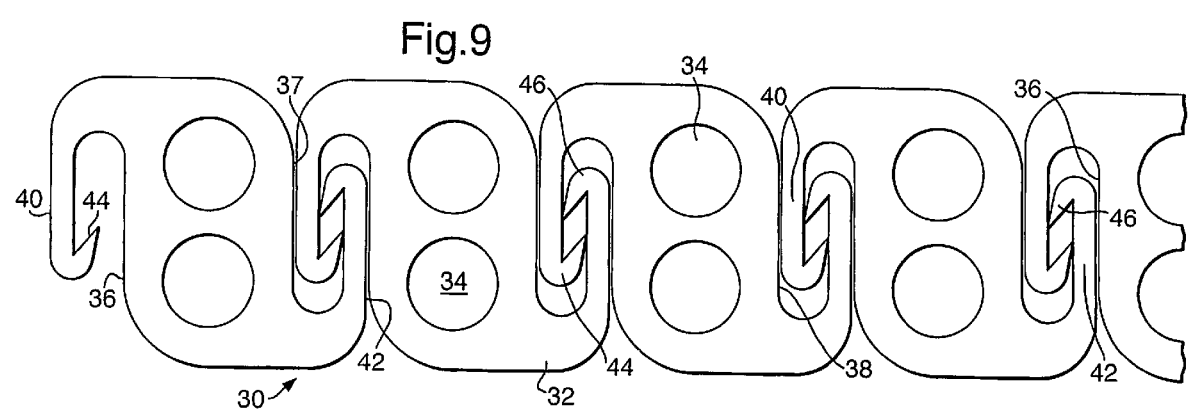
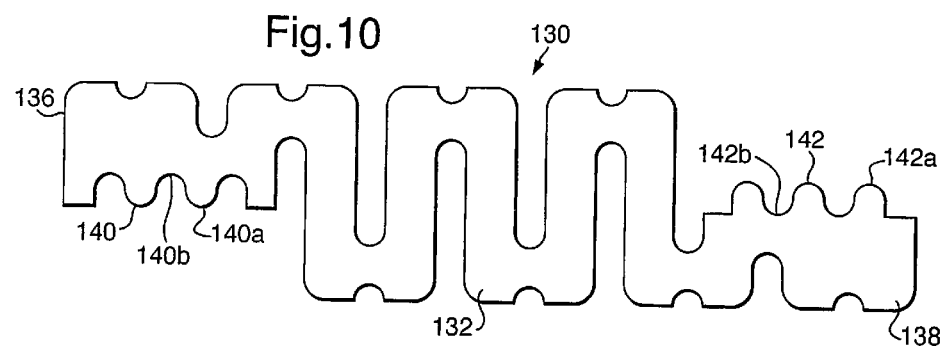

HOSE

This invention relates to hose, and more particularly relates to hose which can be used in cryogenic conditions.

Typical applications for hose involve the pumping of fluids from a fluid reservoir under pressure. Examples include supplying of domestic heating oil or LPG to a boiler; transporting produced oilfield liquids and/or gases from a fixed or floating production platform to the cargo hold of a ship, or from a ship cargo hold to a land-based storage unit; delivering of fuel to racing cars, especially during refuelling in formula 1; and conveying corrosive fluids, such as sulphuric acid.

It is well known to use hose for the transport of fluids, such as liquefied gases, at low temperature. Such hose is commonly used to transport liquefied gases such as liquefied natural gas (LNG) and liquefied petroleum gas (LPG).

In order for the hose to be sufficiently flexible, any given length must be at least partially constructed of flexible materials, i.e., non-rigid materials.

The structure of such hose generally comprises a tubular body of flexible material arranged between an inner and outer helically wound retaining wires. It is conventional for the two wires to be wound at the same pitch, but to have the windings displaced by half a pitch width from one another. The tubular body typically comprises inner and outer layers with an intermediate sealing layer. The inner and outer layers provide the structure with the strength to carry the fluid therein. Conventionally, the inner and outer layers of the tubular body comprise fabric layers formed of a polyester such as polyethylene terephthalate. The intermediate sealing layer provides a seal to prevent the fluid from penetrating the hose, and is typically a polymeric film.

The retaining wires are typically applied under tension around the inside and outside surfaces of the tubular body. The retaining wires act primarily to preserve the geometry of the tubular body. Furthermore, the outer wire may act to restrain excessive hoop deformation of the hose under high pressure. The inner and outer wires may also act to resist crushing of the hose.

A hose of this general type is described in European patent publication no. 0076540A1. The hose described in this specification includes an intermediate layer of biaxially oriented polypropylene, which is said to improve the ability of the hose to resist the fatigue caused by repeated flexing.

Another hose is described in GB-2223817A. The hose described in this publication is a composite hose comprising an inner helical metallic core, a plurality of layers of plastics material fibres and films wound on the core, at least one layer of glass cloth and at least one layer of aluminium foil disposed adjacent to one another and wound onto the plastics material, and an outer helical metallic former. This hose is said to be suitable for transporting flammable fuels and oils.

Another hose is described in GB-1034956A.

The invention is especially applicable to the hose described in WO01/96772. We have made further improvements to the hose described in this application.

Hose in the prior art commonly has very low bending stiffness rendering it susceptible to damaging sharp localised bending. Hose is also often susceptible to damage due to impact, wearing and other external mechanical events. We have found a way to ameliorate these problems.

According to a first aspect of the invention there is provided a hose comprising a tubular body of flexible material arranged between inner and outer helical gripping members, wherein the hose further comprises an elongate member having opposing longitudinal edges, the elongate member being helically wound around the tubular body such that the opposing longitudinal edges of the layer are in an adjacent or overlapping arrangement, wherein each longitudinal edge includes a formation capable of interengaging with a cooperating formation on the opposing longitudinal edge.

The elongate member limits bending radius without impeding the required flexibility of the hose. This layer also provides mechanical protection to the hose.

The interengagement of the turns allows geometric changes to be distributed evenly along the hose length. Preferably the interengaging formations are arranged so as to provide a continuous seal, resulting in the layer being waterproof.

It is possible for the interengaging formations to be arranged at intervals along the longitudinal edges, but it is preferred that they extend substantially continuously along the respective edges. In an embodiment, the interengaging formation is substantially continuous along one longitudinal edge, and is arranged at spaced intervals along the other longitudinal edge.

It is preferred that the elongate member is made of a material capable of being processed into a strip, for example by extrusion. Suitable extrudable materials include thermoplastic materials such as polyvinylchloride or a polyolefin (eg a polyethylene). As an alternative, a polyurethane may be used.

In one embodiment, the interengaging formation on one longitudinal edge is bonded to the interengaging formation on the opposing longitudinal edge to prevent the formations from slipping out of engagement with one another. The bonding may be achieved by, for example, ultrasonic welding, chemical solvent bonding (i.e. using a solvent which forms a reactive bond with the material of the elongate member). The choice of chemical solvent depends on the material of construction of the elongate member. Examples of suitable adhesives for PVC include Stelmax Flexible PVC Solvent Cement, Bostik PVC Weld Cement M5417 and Bondloc PVC Weld Cement S1800. Examples of adhesives suitable for polyurethanes and thermoplastics include Bondloc S1400, and Araldite adhesives, such as Araldite 2018 and Araldite 2026.

In another embodiment, the configuration of the interengaging formations is such that the formations can interlock with one another in order to prevent the formations from slipping out of engagement with one another. In this embodiment, the interengaging comprise interlocking formations.

It is preferred that each interengaging formation comprises a profile arranged along the edge which is shaped to interengage with the other formation.

It is particularly preferred that the profiles are such that when the elongate member is being wound around the tubular body, the formation on the edge being wrapped can be pushed into engagement with the formation of the opposite edge already in place on the tubular body.

As noted above, in one embodiment, the formations may be bonded together with an adhesive.

In another embodiment, the each interengaging formation is configured to provide a push-fit or a snap fit with the interengaging formation of the opposing longitudinal edge. The interlocking formation of each longitudinal edge may include a retaining member, adapted to cooperate with a retaining member on the interlocking formation of the opposing longitudinal edge, whereby the interlocking formations are retained in an interlocking relationship by the retaining members.

The interlocking formations are preferably C-shaped, with the formations on the opposing edge portions being oriented in an opposite direction, whereby the C-shaped formations can interlock when the elongate member is wound around the tubular body. The retaining member preferably comprises an inwardly directed flange arranged at or near one of the ends of the C-shaped member.

Preferably the elongate member includes at least one chamber therewithin, the chamber containing a material having a density lower than the rest of the elongate member, such as a foam or an aerated polymer. The or each chamber may simply contain a fluid, which is preferably a gas such as air.

In one embodiment, the chamber is a longitudinally extending chamber. A plurality of chambers may be arranged at spaced intervals along the length of the elongate member, or, alternatively, the chamber may extend substantially along the length of the elongate member. The chamber serves to improve the buoyancy of the hose. The chamber also serves to improve the thermal insulation of the hose. It is possible for more than one longitudinal chamber to be arranged along the same length of hose. For example, an arrangement with two adjacent chambers both running longitudinally along substantially the entire length of the hose is particularly preferred.

The or each chamber may be of any desired shape, but it is preferred that the shape is cylindrical.

In an embodiment, the or each buoyancy chamber preferably comprises a plurality of closed chamber arranged such as to form a sponge like structure within the elongate member. A structure with this sort of structure helps prevent flooding of the entire chamber in the event that part of the elongate member becomes ruptured.

It is preferred that the or each buoyancy chamber has a length equivalent to substantially 0.5 to 5 pitch lengths of the gripping members, preferably substantially 1 to 2 pitch lengths.

The total volume occupied by the chamber is preferably in excess of 50% of the total volume occupied by the elongate member.

One of the advantages of the hose according to the invention is that the elongate member may be tailored to a given application. For a hose which will be applied in air as a cryogenic conduit, a relatively slim (in thickness) layer may be optimal. For deployment in liquids, such as on the sea, considerably more buoyancy and flexural rigidity may be desirable and both the buoyancy chamber and the interengaging mechanism may be more substantial.

In one preferred embodiment, the elongate member has a thickness greater than the distance between the longitudinal edges.

The elongate member may be provided between the tubular body and the outer gripping member, but it is preferred that the tubular body is provided around the outer gripping member.

The elongate member provides a number of benefits to the hose. It provides the hose with improved impact resistance, and is easy to retrofit onto an existing hose. It does not have the sensitivity to strain localisation which would be experienced by a continuous tubular layer (i.e. a layer which has been applied as a sock, rather than by wrapping). With a tubular sheath it is difficult to produce uniform wall thickness; and strains all occur at the weak points, rather than being uniformly distributed over the hose length. The inclusion of the buoyancy chamber improves the buoyancy of the hose, and also improves its thermal resistance.

In a preferred embodiment, the inner and/or the outer gripping member is/are provided with a profiled cross section in order to reduce the hose friction factor. Particularly preferred profiles include an oval cross-sectional shape or a semi-circular cross-sectional shape, aligned to provide the least resistance to the flow.

According to a second aspect of the invention there is provided a hose comprising a tubular body of flexible material arranged between inner and outer gripping members, wherein the hose further comprises an elongate member having opposing longitudinal edges, the elongate member being helically wound around the tubular body such that the opposing longitudinal edges of the layer are in an adjacent or overlapping arrangement, wherein the elongate member has at least one buoyancy chamber therein.

The elongate member may have any combination of the features of the elongate member described above in connection with the first aspect of the invention.

According to a third aspect of the invention there is provided a hose comprising a tubular body of flexible material arranged between inner and outer gripping members, wherein the inner and/or outer gripping member is/are provided with a profiled cross-section.

Again, the elongate member may have any combination of the features of the elongate member described above in connection with the first aspect of the invention.

The hose according to the aspects of the invention described above may also be provided with one or more of the features of the hose already described in WO01/96772. These will be described in greater detail below.

This the hose preferably further comprise an axial strengthening means adapted to reduce deformation of the tubular body when the tubular body is subjected to axial tension, and the axial strengthening means is further adapted to exert a radially inward force on at least part of the tubular body when axial strengthening means is subjected to axial tensioning. The failure strain of the tubular body and the axial strengthening means is preferably within the range of 1 to 10%. More preferably the failure strain is in excess of 5% at ambient and cryogenic temperatures. In addition, the materials of the tubular body and the axial strengthening means are advantageously compatible so that they each perform in a similar manner when in operation, so that no single component is subjected to excessive stresses and strains. This means that the materials of the tubular body and the axial strengthening means respond to strain in a similar manner. A bend strain (for a cylindrical component) of at least 3% is generally needed for the type of hose applications primarily envisaged by the present invention. While, inter-layer slip and the straightening of helically oriented components will account for some of this slip, there will still be a resultant strain in the order of 1% acting on the structural components of the hose wall. This compares to a typical yield strain of 0.2% for metals.

It is preferred that the axial strengthening means is made of a non-metallic material, especially a plastics material—suitable materials are discussed in detail below. This is because metallic materials are unlikely to have the desired strain characteristics.

It is preferred that the tubular body and the axial strengthening means comprise the same material, most preferably ultra high molecular weight polyethylene (UHMWPE), as described in further detail below.

The tubular body preferably comprises at least one reinforcing layer and at least one sealing layer. More preferably, there are at least two reinforcing layers with the sealing layer sandwiched therebetween. In the preferred embodiment, the reinforcing layers and the sealing layers are wrapped around the inner gripping member.

Preferably, a further reinforcing layer is provided between the outer gripping member and the axial strengthening means.

The ultimate strength of the reinforcing layer(s) is preferably between 100 and 700 kN for an 8" (200 mm) diameter hose. It is preferable that the bend strain at failure of the reinforcing layer(s) is in the range 2% to 15%. Desirably, further reinforcing layer(s) are the same material as the axial strengthening means, most preferably UHMWPE.

Preferably the axial strengthening means comprises a generally tubular sheath formed of a sheet of material provided in a tubular shape, such that the sheath can maintain the integrity of its tubular shape when subjected to axial tension. The hose may be provided with two or more tubular sheaths in order to further improve the performance of the hose under axial tension.

It is preferred that the axial strengthening means is provided in the form of a generally tubular braid. In this specification the term "braid" refers to a material which is formed of two or more fibres or yarns which have been intertwined to form an elongated structure. It is a feature of braid that it can elongate when subjected to an axial tension. It is a further feature of braid that, when provided in a tubular form, its diameter will reduce when the braid is subjected to axial tension. Thus by providing a tubular braid around the tubular body, or within the structure of the tubular body, the braid will exert a radially inward force on at least part of the tubular body when subjected to axial tension.

It is preferred that the entire tubular sheath is provided in the form of the braid. However, it is possible for only one or more parts of the length of the tubular sheath to be provided in the form of the braid.

It is also preferred that the braid extends all the way around the circumference of the tubular sheath. However, it is possible for only part of the circumference of the tubular sheath to be provided in the form of the braid.

The braid may be provided in a biaxial form (i.e. in which the braid is formed of only two intertwining fibres or yarns) or in a triaxial form (i.e. in which there are also longitudinally extending fibres or yarns, for increased axial strength).

Although it is preferred to provide the axial strengthening means in the form of a braid, it may be provided in other forms which meet the functional requirements specified above. Thus, the axial strengthening means may be provided as a suitable arrangement of cords or ropes helically wrapped around the tubular body.

The materials of construction of the hose should be selected to enable the hose to perform in the environment for which it is intended. Thus, there is a need for the hose to be able to transport pressurised fluids therethrough without leakage of the fluid through the walls of the hose. There is also a need for the hose to withstand repeated flexing, and to withstand the axial stresses caused by the combination of the hose and fluid weight. Also, if the hose is intended for use in transporting cryogenic fluids, the materials should be capable of operating at extremely cold temperatures without any significant reduction in performance.

The main purpose of the or each reinforcing layer is to withstand the hoop stresses which the hose is subjected to during transport of fluids therethrough. Thus, any reinforcing layer which has the required degree of flexibility, and which can withstand the necessary stresses, will be adequate. Also, if the hose is intended for transporting cryogenic fluids, then the or each reinforcing layer must be able to withstand cryogenic temperatures.

We prefer that the or each reinforcing layer is formed of a sheet of material which has been wound into a tubular form by winding the sheet material in a helical manner. This means that the or each reinforcing layer does not have much resistance to axial tension, as the application of an axial force will tend to pull the windings apart. The or each reinforcing layer may comprise a single continuous layer of the sheet material, or may comprise two or more single continuous layers of the sheet material. However, more usually (and depending on the length of the hose) the or each layer of the sheet material would be formed of a plurality of separate lengths of sheet material arranged along the length of the hose.

In the preferred embodiment each reinforcing layer comprises a fabric, most preferably a woven fabric. The or each reinforcing layer may be a natural or synthetic material. The or each reinforcing layer is conveniently formed of a synthetic polymer, such as a polyester, a polyamide or a polyolefin. The synthetic polymer may be provided in the form of fibres, or a yarn, from which the fabric is created.

When the or each reinforcing layer comprises a polyester, then it is preferably polyethylene terephthalate.

When the or each reinforcing layer comprises a polyamide, then it may be an aliphatic polyamide, such as a nylon, or it may be an aromatic polyamide, such as an aramid compound. For example, the or each reinforcing layer may be a poly-(p-phenyleneterephthalamide) such as KEVLAR (registered trade mark).

When the or each reinforcing layer comprises a polyolefin, then it may be a polyethylene, polypropylene or polybutylene homopolymer, or a copolymer or terpolymer thereof, and is preferably monoaxially or biaxially oriented. More preferably, the polyolefin is a polyethylene, and most preferably the polyethylene is a high molecular weight polyethylene, especially UHMWPE.

The UHMWPE used in the present invention would generally have a weight average molecular weight above 400,000, typically above 800,000, and usually above 1,000,000. The weight average molecular weight would not usually exceed about 15,000,000. The UHMWPE is preferably characterised by a molecular weight from about 1,000,000 to 6,000,000. The UHMWPE most useful in the present invention is highly oriented and would usually have been stretched at least 2-5 times in one direction and at least 10-15 times in the other direction.

The UHMWPE most useful in the present invention will generally have a parallel orientation greater than 80%, more usually greater than 90%, and preferably greater than 95%. The crystallinity will generally be greater than 50%, more usually greater than 70%. A crystallinity up to 85-90% is possible.

UHMWPE is described in, for example, U.S. Pat. Nos. 4,344,908, 4,411,845, 4,422,993, 4,430,383, 4,436,689, EP-A-183285, EP-A-0438831, and EP-A-0215507.

It is particularly advantageous that the or each reinforcing layer comprises a highly oriented UHMWPE, such as that available from DSM High Performance Fibres BV (a Netherlands company) under the trade name DYNEEMA, or that available from the US corporation AlliedSignal Inc. under the trade name SPECTRA.

Additional details about DYNEEMA are disclosed in a trade brochure entitled "DYNEEMA; the top performance in fibers; properties and application" issued by DSM High Performance Fibers BV, edition Feb. 1998. Additional details about SPECTRA are disclosed in a trade brochure entitled "Spectra Performance Materials" issued by AlliedSignal Inc., edition May 1996. These materials have been available since the 1980s.

In the preferred embodiment, the or each reinforcing layer comprises a woven fabric formed of fibres arranged in a weft and warp direction. We have found that it is particularly advantageous if the or each reinforcing layer is arranged such that the fabric warp direction is at an angle of less than or equal to 20° to the axial direction of the hose; we also prefer that this angle is greater than or equal to 5°. In the preferred embodiment, the or each reinforcing layer is arranged such that the fabric warp direction is at an angle of from 5° to 15°, most preferably about 10°, to the axial direction of the hose. The tolerance in these figures is about 1-2°.

The axial strengthening means may also be formed of the same material as the or each reinforcing layer. Thus, it will be clear that the axial strengthening means, the or each reinforcing layer and the sealing layer may all be formed from the same basic compound. However, the form of the compound must be different in order to provide the required function, i.e., the axial strengthening means provides an axial reinforcement function, the or each reinforcing layer provides reinforcement against hoop stresses, and the sealing layer provides a sealing function. We have found that the UHMWPE materials are most suitable, particularly the DYNEEMA and SPECTRA products. These material have also been found to work well in cryogenic conditions. The preferred parameters of the UHMWPE (molecular weight range, etc) discussed above in relation to the reinforcing layers, are also appropriate to the axial strengthening means. In this regard is should be noted, however, that the parameters of the UHMWPE used in the axial strengthening means need not be the same as the parameters of the UHMWPE used in the reinforcing layers.

It would be possible for the axial strengthening means to be provided within the layers of the tubular body. However we prefer than the axial strengthening means is positioned between the tubular body and the outer gripping member. In an another preferred embodiment, the axial strengthening means is provided within the layers of the tubular body, and a further axial strengthening means is also provided between the tubular body and the outer gripping member.

The purpose of the sealing layer is primarily to prevent the leakage of transported fluids through the tubular body. Thus, any sealing layer which has the required degree of flexibility, and which can provide the desired sealing function, will be adequate. Also, if the hose is intended for transporting cryogenic fluids, then the sealing layer must be able to withstand cryogenic temperatures.

The sealing layer may be made from the same basic materials as the or each reinforcing layer. As an alternative, the sealing layer may be a fluoropolymer, such as: polytetrafluoroethylene (PTFE); a fluorinated ethylene propylene copolymer, such as a copolymer of hexafluoropropylene and tetrafluoroethylene (tetrafluoroethylene-perfluoropropylene) available from DuPont Fluoroproducts under the trade name Teflon FEP; or a fluorinated hydrocarbon—perfluoralkoxy—available from DuPont Fluoroproducts under the trade name Teflon PFA. Another suitable material is an ethylene chlorotrifluoroethylene film (ECTFE), particularly Halar ECTFE. These films may be made by extrusion or by blowing.

We prefer that the sealing layer is formed of a sheet of material which has been wound into a tubularform by winding the sheet material in a helical manner. As with the reinforcing layers, this means that the or each sealing layer does not have much resistance to axial tension, as the application of an axial force will tend to pull the windings apart. The sealing layer may comprise a single continuous layer of the sheet material, or may comprise two or more single continuous layers of the sheet material. However, more usually (and depending on the length of the hose) the or each layer of the sheet material would be formed of a plurality of separate lengths of sheet material arranged along the length of the hose. If desired the sealing layer may comprise one or more heat shrinkable sealing sleeves (i.e. tubular in form) which are arranged over the inner reinforcing layer.

We prefer that the sealing layer comprises a plurality of overlapping layers of film. Preferably there would be at least 2 layers, more preferably at least 5 layers, and still more preferably at least 10 layers. In practice, the sealing layer may comprise 20, 30, 40, 50, or more layers of film. The upper limit for the number of layers depends upon the overall size of the hose, but it is unlikely that more than 100 layers would be required. Usually, 50 layers, at most, will be sufficient. The thickness of each layer of film would typically be in the range 50 to 100 micrometres.

It will, of course, be appreciated that more than one sealing layer may be provided.

In an embodiment, the sealing layer comprises at least two polymeric films, one of the films being made of a first polymer and another of the films being made of a second polymer different from the first polymer.

In this embodiment, one of the polymeric films is stiffer than the other of the films, whereby a differential yield strain is present in the material properties at the operating temperature and pressure. Preferably the outer film is stiffer than the inner film. The effect of this is that in the unfortunate occurrence of a hose burst, there is a controlled failure of the sealing layer such that the stiffer outer polymer fails while the more ductile polymer holds the internal pressure for a finite time, allowing the pressure gradually to dissipate.

In this preferred embodiment, the maximum strain at failure is in excess of 100% at ambient temperature for the more ductile layer, and is at least 20% less for the other layer.

Each polymeric film of the sealing layer is preferably a polyamide, a polyolefin or a fluoropolymer.

When the polymeric film of the sealing layer comprises a polyamide, then it may be an aliphatic polyamide, such as a nylon, or it may be an aromatic polyamide, such as an aramid compound.

We prefer that one of the polymeric films of the sealing layer is a polyolefin and that another of the polymeric films of the sealing layer is a fluoropolymer.

Suitable polyolefins include a polyethylene, polypropylene or polybutylene homopolymer, or a copolymer or terpolymer thereof. Preferably the polyolefin film is monoaxially or biaxially oriented. More preferably, the polyolefin is a polyethylene, and most preferably the polyethylene is a high molecular weight polyethylene, especially UHMWPE, which is described in greater detail above. The preferred parameters of the UHMWPE (molecular weight range, etc) discussed above in relation to the reinforcing layers, are also appropriate to the sealing layer. In this regard is should be noted, however, that the parameters of the UHMWPE used in the sealing layer need not be the same as the parameters of the UHMWPE used in the reinforcing layers.

Since the sealing layer is intended to provide a sealing function, the sealing layer should be provided in the form of a film which is substantially impermeable to the transported fluids. Thus, the highly oriented UHMWPE needs to be provided in a form which has satisfactory sealing properties. These products are usually provided in the form of a solid block which can be further processed in order to obtain the material in the required form. The film may be produced by skiving a thin film off the surface of the solid block. Alternatively the films may be blown films of UHMWPE.

Suitable fluoropolymers include polytetrafluoroethylene (PFTE); a fluorinated ethylene propylene copolymer, such as a copolymer of hexafluoropropylene and tetrafluoroethylene (tetrafluoroethylene-perfluoropropylene) available from DuPont Fluoroproducts under the trade name Teflon FEP; or a fluorinated hydrocarbon—perfluoralkoxy—available from DuPont Fluoroproducts under the trade name Teflon PFA.

Another suitable material is ECTFE, particularly Halar ECTFE. These films may be made by extrusion or by blowing.

Preferably, the sealing layer comprises a plurality of layers of each of the polymeric films. In an embodiment, the layers may be arranged so that the first and second polymers alternate through the thickness of the sealing layer. However, this is not the only possible arrangement. In another arrangement all the layers of the first polymer may be surrounded by all the layers of the second polymer, or vice versa.

It will, of course, be appreciated that more than one of the sealing layers may be provided.

Preferably, the sealing layer further comprises at least one layer partially or entirely comprising a metal, a metal oxide or a mixture thereof. In this specification references to metal containing films includes metal oxide containing films, unless stated otherwise. Thus, the metal layer may be a layer of metallic film (i.e. a separate layer consisting substantially entirely of a metal, a metal oxide or a mixture thereof), or a polymer coated metallic film or a metallised polymer film. We prefer that the metal layer is a polymer coated metallic film. The metal may be, for example, aluminium oxide. The polymer may be, for example, a polyester.

Suitable polymer coated metal films include the films available from HiFi Industrial Film, of Stevenage, England, under the trade names MEX505, MET800, MET800B and MET852; MET800B is preferred.

A further metal layer may be disposed outwardly of the sealing layer. Preferably, the further metal layer is disposed between the tubular body and the outer gripping member. Rockwool layers may also be provided here to improve the thermal insulation, preferably between the sealing layer and the outer metal layer—the aim of this is to create a thermal annulus between the two metal layers.

The metal containing film is reflective and therefore reduces heat loss or heat gain—this is especially useful for cryogenic applications. In addition the metal containing film provides good barrier properties, thereby reducing vapour transmission—this is useful to prevent material loss transporting gases.

Another the feature of the sealing layer is that it comprises an UHMWPE. If the UHMWPE sealing layer is formed of heat shrinkable sleeves, it is not essential for the sleeves to be made of different materials, but they should preferably be made of UHMWPE.

Preferably, the sealing layer comprises at least two polymeric films of different materials, and at least one of the films comprises an ultra high molecular weight polyethylene.

Another preferable embodiment of the invention relates to a cured resin matrix disposed around the tubular body, the outer gripping member being at least partially embedded in the resin matrix in order to restrict relative movement between the outer gripping member and the rest of the hose.

The cured resin matrix must have sufficient flexibility to allow the hose to bend to the extent that is required for the specific applications of the hose. Clearly, some applications may require more flexibility than others.

The resin matrix preferably comprises a synthetic polymer, such as polyurethane. It is especially preferred that the resin matrix is made of a material that, prior to curing, is capable of being applied in liquid form to the hose. Typically, the uncured resin may be applied to the hose by spraying, pouring or painting. This enables the uncured resin to be applied over the outer surface of the tubular body and the outer gripping members, and then cured in-situ to form a solid, flexible coating. The mechanism of curing may be light, moisture, etc.

The resin matrix may bond to a layer under the outer gripping member and also to any layer provided on the outer surface of the resin matrix. It is preferred that at least one of the layers adjacent the cured resin matrix is capable of withstanding cryogenic temperatures, so that, if the resin matrix cracks owing to the cryogenic temperatures, the adjacent layer holds the resin matrix together by virtue of the adhesion between the resin matrix and the adjacent layer. The most stable structure is achieved when both sides of the resin matrix are bonded to adjacent layers.

We have also found that certain materials can provide hose with especially good insulation, particularly at cryogenic temperatures, In particular, we have found that fabrics formed of basalt fibres provide particularly good insulation.

Suitable basalt fibre fabrics are available from the Sudaglass Fiber Company under the trade designations BT-5, BT-8, BT-10, BT-11 and BT-13. The preferred thickness of the fabric is from about 0.1 mm up to about 0.3 mm. If desired, a plurality of layers of the basalt fabric may be employed.

We have also found that the insulation properties of basalt fabrics improve under compression, therefore we prefer to provide a compression layer around the basalt fabric, which serves to compress the basalt layer.

The insulation layer may further include layers made of other insulation material, such as polymeric foams, in addition to the layer(s) of basalt fabric.

We prefer that the insulation layer further includes at least one reinforcement layer. The reinforcement layer may comprise a synthetic polymer, such as a polyester, a polyamide or a polyolefin. The reinforcement layer may be made of the same materials as the inner and outer reinforcing layers of the tubular body, which are described above. It is particularly preferred that the reinforcement layer of the insulation layer is an ultra high molecular weight polyethylene (UHMWPE), such as DYNEEMA or SPECTRA, as described above.

Another preferred embodiment of the invention involves a layer comprising a plastics material having gas bubbles therein.

The plastics material is preferably a polyurethane. It is preferred that the plastics material is applied to the tubular body by spraying the plastics material, in liquid form, over the surface of the tubular body, then leaving it to cure. Again, the curing may take place simply by leaving the coated hose to stand in air, or may be effected, or accelerated, by an active means such as heating.

The gas bubbles may be incorporated by injecting the gas into the plastics material, before spraying, while it is still in a liquid form.

The resultant layer of gas-containing plastics material has some of the beneficial structural properties of the plastics material itself, such as good wear and crush resistance, but also has substantially improved insulation properties. It also has improved buoyancy caused by the presence of the gas, and can be used to produce a hose capable of floating in water and with evenly distributed buoyancy along its length.

Preferably the gas-containing plastics material is covered by a further layer of plastics material, which does not contain any substantial amount of gas bubbles. Preferably this further layer of plastics material is bonded securely to the gas-containing layer. The further layer of plastics material may be the same plastics material as the gas-containing layer. Preferably the further layer of plastics material comprises a polyurethane.

Both layers of plastics material can be applied by techniques other than spraying, such as pouring, painting or extrusion.

Any suitable gas may be used to form the bubbles, including air, nitrogen or an inert gas.

The specific gravity of the polyurethane, prior to aeration, is preferably approximately 1.2.

The hose typically has a specific gravity of around 1.8 without the gas-containing layer. Preferably the hose has an overall specific gravity of less than 1, preferably less than 0.8, after application of the gas-containing layer. The PU coating thickness may be, for example, about 4-8 mm, preferably about 6 mm. The gas bubbles are preferably less than about 2 mm in diameter.

In particular the invention may include a layer comprising a cured resin matrix, as described above, in addition to a gas containing layer. In this construction, the gas containing layer would typically be disposed outwardly of the cured resin matrix. It is possible for the gas containing layer to replace the cured resin matrix, such that the gas containing layer has the gripping members embedded therein to restrict relative movement of the outer gripping members.

In another preferred embodiment, the hose may be provided with an end fitting comprising: an inner member adapted to be disposed at least partially within the hose; a sealing member adapted to seal at least part of the tubular body fully around the circumference between the sealing member and the inner member; and a separate load transferring means adapted to transfer axial loads between the hose and the inner member in such a manner that said axial loads are diverted around the sealing member in order to reduce, or eliminate, the axial load on the hose between the sealing member and the inner member, and wherein the sealing member is adapted to seal against the tubular body independently of the application of axial loads between the hose and the inner member.

Preferably the sealing member is adapted to seal at least part of the tubular body fully around the circumference between the sealing member and the inner member.

The inner member is preferably substantially cylindrical, and the sealing member is preferably in the form of a ring adapted to receive the inner member therein, so that the tubular body can be clamped between the outer surface of the inner member and the inner surface of the ring.

The sealing between the sealing member and the inner member can be achieved in a number of ways. For example, in one embodiment, the sealing member may be provided in the form of a split ring which can be tightened to provide an adequate seal. In another embodiment, the sealing member may simply comprise a sealing ring which is an interference fit with the inner member.

However, in the preferred embodiment, the sealing member comprises an inner sealing ring and an outer split ring which can be tightened in order to force the sealing ring into engagement with the tubular body and the inner member. In this embodiment it is preferred that the sealing ring is an interference fit with the inner member, in order to further improve the sealing.

The inner member, the sealing ring and the split ring may be any suitable material. Typically, the inner member and the split ring would be made of stainless steel. The sealing ring could be made of stainless steel, but it is preferred that it is made of polytetrafluoroethylene (PTFE).

The sealing member preferably has the features of the sealing member described hereinafter.

The load transferring means preferably comprises a hose engaging member, a load transmitting member and an end member secured to the inner member. The arrangement is such that the sealing member is disposed between the load transmitting member and the end member, and that the hose engaging member and the end member are connected through the load transmitting member.

The hose engaging member is adapted to engage the hose in such a manner that at least part of the axial forces within the hose are transferred from the hose to the hose engaging member. The hose engaging member transfers these forces to the load transferring member, and the load transferring member transfers these forces to the end member. In this way, at least part of the axial forces in the hose bypass the sealing member, thereby improving the reliability of the seal provided by the sealing member.

It is preferred that the inner member and the load transferring means include a portion configured to receive the wires of the hose. The inner member can be provided with helical recesses adapted to receive the inner wire therein, and the load transferring means can be provided with helical recesses adapted to receive the outer wire therein. Preferably, it is the hose engaging member of the load transferring means which is provided with the helical recesses.

The load transferring member preferably comprises a load transferring plate, which is typically disk shaped, having an aperture adapted to receive the hose therethrough; plate has a surface engageable with the hose engaging member, whereby loads can be transferred from the hose engaging member to the plate. The load transferring member preferably further includes a load transferring rod secured between the plate and the end member for transferring loads from the plate to the end member. A tightening member, such as a nut, can be provided on the rod.

The inner member preferably has a hose end which is adapted to extend within an end portion of the hose, and a tail end remote from the hose end. The end member is arranged on one side of the sealing member, adjacent the tail end, and the hose engaging member is arranged on the other side of the sealing member adjacent the hose end.

Preferably the outer surface of the inner member is provided with at least one formation thereon which is adapted to engage said part of the tubular member, below the sealing ring. The or each formation acts to improve the seal of the tubular member and to make it more difficult for the tubular member to be pulled from between the inner member and the sealing ring. It is preferred that the or each formation comprises a projection extending circumferentially around the outer surface of the inner member. Desirably, there are two or three of said formations.

In another preferred embodiment of the invention, the hose is provided with an end fitting which comprises: an inner member adapted to be disposed at least partially within the hose; and a sealing ring adapted to seal at least part of the tubular body between the sealing ring and the inner member; wherein the sealing member comprises a sealing ring and a compression member for compressing the sealing ring into sealing engagement with said part of the tubular body, and the compression member is tightenable against the sealing member in order to selectively increase or decrease the compression force of the compression member against the sealing member.

In one preferred embodiment, the compression member is tightenable against the sealing member in order to selectively increase or decrease the compression force of the compression member against the sealing member.

In another preferred embodiment, the compression member and the sealing ring are removably securable to the hose.

Thus, in accordance with the present invention there is no unrecoverable plastic deformation in the components of the end fitting.

Preferably, the compression member is adapted to compress the sealing ring equally in all directions.

Preferably, the compression member is of adjustable diameter, and further comprises a tightening means which can apply a force to reduce the diameter of the compression member, thereby compressing the sealing ring within the compression member. We prefer that the compression member comprises a split ring or a jubilee clip.

In a preferred embodiment, the compression member is made of a material which contracts less than the sealing ring when subjected to cooling. This provides an advantageous way of making the hose, as described below. The sealing ring and the compression member may be any suitable material. There are a number of materials which have the desired difference in contraction under cooling. We prefer that the compression member is stainless steel and the sealing ring is polytetrafluoroethylene (PTFE). More preferably, the sealing ring comprises reinforced PTFE, such as glass or metal filled PTFE, as this helps to prevent creep. The sealing ring preferably comprises 10 to 40 wt %, particularly 10 to 20 wt % of the glass filling. Examples of suitable metal fillers include bronze and/or stainless steel.

It is preferred that the inner member is made of a material which contracts less than the sealing ring when subjected to cooling. This feature has the effect that when the end fitting is cooled, the sealing ring contracts more than the inner member, thereby tightening the grip of the sealing ring on the inner member, and improving the seal. The inner member may be made of any suitable material. Stainless steel has been found to be particularly suitable.

Preferably the outer surface of the inner member is provided with at least one formation thereon which is adapted to engage said part of the tubular member, below the sealing ring. The or each formation stretches the film, which acts to improve the seal of the tubular member and to make it more difficult for the tubular member to be pulled from between the inner member and the sealing ring; the stretching makes a more even and smoother film surface under the seal. It is preferred that the or each formation comprises a projection extending circumferentially around the outer surface of the inner member. Desirably, there are two or three of said formations.

It is preferred that the sealing ring is an interference fit with the inner member.

In a preferred embodiment, the end fitting further comprises a load transferring means as described above.

The hose engaging member may transfer loads from the hose simply by virtue of the frictional forces between the hose and the hose engaging member. However, it is preferred that the hose engaging member is adapted to secure a part of the hose which is folded back over an outer part of the hose engaging member. This arrangement makes it possible for the folded part of the hose to transmit loads to the hose engaging member. The folded part of the hose may be part of the tubular body, but it is preferably an axial strengthening means in the form of a braid, as described below.

When the hose is intended for cryogenic applications, then it is desirable to provide insulation over the tubular body. The insulation could be provided between the outer wire and the tubular sheath and/or outside the outer wire. The insulation may comprise material conventionally used to provided insulation in cryogenic equipment, such as a synthetic foam material. It is preferred that the axial strengthening means is also provided around the insulating layer to compress the insulation layers and maintain their structural integrity. The axial strengthening means around the insulation layer is preferably provided in addition to the axial strengthening means between the outer gripping member and the tubular body. A particular suitable form of insulation is provided in further detail below.

According to another aspect of the invention there is provided a method of making a hose comprising:
(a) wrapping a wire around a tubular mandrel to form an inner coil;
(b) wrapping a sheet material around the tubular mandrel and the inner coil order to provide a tubular body formed of the sheet material;
(c) wrapping a wire around the tubular body to form an outer coil;
(d) wrapping an elongate member around the outer coil, the elongate member having opposing longitudinal edges, each longitudinal edge including a formation capable of interengaging with a cooperating formation on the opposing longitudinal edge, wherein the elongate member is helically wound around the outer coil such that the opposing longitudinal edges of the elongate member are in an adjacent or overlapping arrangement, and bringing the formations on adjacent or overlapping edges into engagement with one another;
(e) securing the ends of the hose produced in step (d);
(f) removing the hose from the mandrel.

There may be other layers, helical or continuous, either above or below the elongate member in the cross-section.

Preferably the sheet material in step (b) comprises two reinforcing layers sandwiching a sealing layer, as described above. In the preferred embodiment, an inner reinforcing layer, in sheet form, is wrapped helically around the inner coil and the mandrel; then the sealing layer, in sheet form, is wrapped helically around the inner reinforcing layer; then the outer reinforcing layer, in sheet form, is wrapped around the sealing layer. Usually a plurality of sealing layers would be applied.

The method according to the invention may also be provided with one or more of the features of the methods already described in WO01/96772. These will be described in greater detail below.

Preferably the following step is performed between steps (b) and (c):
(b)(i) pulling a tubular axial strengthening sheath over a free end of the mandrel, so that the mandrel extends within the axial strengthening sheath, then pulling the axial strengthening sheath along the mandrel so that it at least partially covers the tubular body;

Preferably the coils and the sheet material are applied under tension in order to provide the hose with good structural integrity.

The tubular axial strengthening sheath may be the same as the axial strengthening sheath described above, and is preferably a braid.

Preferably the inner and outer coils are applied in a helical configuration having the same pitch, and the position of the coils of the outer coil are positioned half a pitch length offset from the position of the coils of the inner coil.

When the hose is intended for cryogenic applications, then it is desirable to provide insulation over the tubular body. The insulation could be provided between the outer wire and the tubular member and/or outside the outer wire. The insulation may comprise material conventionally used to provided insulation in cryogenic equipment, such as a synthetic foam material. One particularly suitable form of insulation is described below.

In one preferred embodiment, the method further includes the steps of:

(g) applying a curable liquid resin over the outer surface of the tubular body and the outer wire; and (h) allowing the resin to cure.

It is preferred that the steps (g) and (h) are performed between the steps (d) and (e).

Preferably, the method further comprises applying an insulation layer over the cured resin. The insulation layer preferably comprises a fabric formed of basalt fibres, as described above.

In step (c), the tubular body may comprise a tubular body as described above. In particular, the tubular body may include one or more insulation layers made of conventional insulation material and/or made of the basalt fibre fabric described above.

The curing may take place simply by leaving the coated hose to stand in air, or may be effected, or accelerated, by an active means such as heating.

In another preferred embodiment, the method further includes the steps:

(i) applying an curable aerated liquid resin over the outer surface of the tubular body and the outer wire;

(j) allowing the resin to cure to form a solid plastics coating containing gas bubbles therein;

It is preferred that the steps (i) and (j) are performed between the steps (d) and (e).

The term aerated is used to mean that the resin has been charged with a gas, whereby, upon curing, the resin forms a solid material containing gas bubbles therein. As described above, the gas may be, but need not necessarily be, air.

In a preferred embodiment, the method includes the following steps:

(k) disposing an inner member in an open end of the hose;

(l) clamping a load transferring means to an outer surface of the hose; and (m) clamping a sealing member to an outer surface of the tubular body.

Preferably, the axial strengthening member is clamped by the load transferring means, and the method further includes the following step after step (m):

(n) folding back the tubular axial strengthening member over a part of the load transferring means.

Preferably the coils and the sheet material are applied under tension in order to provide the hose with good structural integrity.

It is possible for the hose to be removed from the mandrel before the end fitting is disposed within it. Alternatively, the end fitting can be disposed within the rest of the hose by sliding the inner mandrel therealong up to an end of the hose, then securing the rest of the hose to the end fitting while the end fitting and the rest of the hose remain on the mandrel.

A separate end fitting may, of course, be applied to each end of the hose.

In another preferred embodiment, the method includes the following steps:

(o) disposing an inner member in an open end of the hose;

(p) applying a sealing ring over an outer surface of the tubular body; and (q) applying a compression member over the sealing ring, and compressing the sealing member into sealing engagement with the tubular member and the inner member using the compression member.

Preferably, the compression member is made from a material which contracts less than the sealing ring when subjected to cooling. Preferably also, the compression member includes a means for adjusting the compressive force applied to the sealing ring; a split ring is particularly suitable for use as the compression member. This arrangement makes possible a particularly preferred manufacturing process.

In this process, the compression member is applied to the sealing ring and tightened, then the compression member and sealing ring are subjected to at least one cooling cycle. This causes the sealing member to contract relative to the compression member, whereby the compressive force applied by the compression member is reduced. While the cooling is maintained, the compressive force applied by the compression member is then readjusted to bring it back to approximately the same level as before the cooling, and then the temperature is increased. This cycle may be applied as many times as desired. It is preferred that the cooling cycle is applied at least two or three times and that each time the end fitting is cooled to temperatures at least 5° C. below the intended operating temperature of the hose. This technique has three important benefits.

First, if the hose is operated at temperature above the cooling temperature, then the sealing ring will receive additional compression from the compression member by virtue of the thermal expansion of the sealing member which will take place after the cooling is removed.

Second, the hose will have substantial seal energisation at temperatures at least as low as the cooling temperature. This is particularly useful when the hose is to be used in cryogenic applications. Thus, the temperature to which the hose is cooled is preferably as low as the temperature to which the hose will be subjected in the use for which it is intended. In general, we prefer that the cooling temperature is −50° C. or less, more preferably −100° C. or less, and still more preferably −150° C. or less. Preferably, the cooling is carried out with liquid nitrogen, whereby the cooling temperature can be as low as about −196° C.

Third, the possibility of creep failure is much reduced, or even eliminated, by utilising the hydrostatic stress provided by the compression member.

We prefer that the inner member is made of a material which contracts less than the sealing ring when subjected to cooling. This has the effect that cooling the end fitting causes the sealing ring to grip the inner member more tightly, thereby improving the sealing of the end fitting when the hose is operated at low temperatures.

Preferably the coils and the sheet material are applied under tension in order to provide the hose with good structural integrity.

In the above described aspects of the invention, the gripping members typically each comprise a helically wound wire. The helices of the wires are typically arranged such that they are offset from one another by a distance corresponding to half the pitch of the helices. The purpose of the wires is to grip the tubular body firmly therebetween to keep the layers of the tubular body intact and to provide structural integrity for the hose. The inner and outer wires may be, for example, mild steel, austenitic stainless steel or aluminium. If desired, the wires may be galvanised or coated with a polymer.

It will be appreciated that although the wires making up the gripping members may have a considerable tensile strength, the arrangement of the wires in coils means that the gripping members can deform when subjected to relatively small axial tension. Any significant deformation in the coils will quickly destroy the structural integrity of the hose.

The hose according to the invention can be provided for use in a wide variety of conditions, such as temperatures above 100° C., temperatures from 0° C. to 100° C. and temperatures below 0° C. With a suitable choice of material, the hose can be used at temperatures below −20° C., below −50° C. or even below −100° C. For example, for LNG transport, the hose may have to operate at temperatures down to −170° C., or even lower. Furthermore, it is also contemplated that the hose may be used to transport liquid oxygen (bp −183° C.) or liquid nitrogen (bp −196° C.), in which case the hose may need to operate at temperatures of −200° C. or lower.

The hose according to the invention can also be provided for use at a variety of different duties. Typically, the inner diameter of the hose would range from about 2 inches (51 mm) to about 24 inches (610 mm), more typically from about 8 inches (203 mm) to about 16 inches (406 mm). The hose diameter is usually at least 4 inches (102 mm), more usually at least 6 inches (152 mm).

In general, the operating pressure of the hose would be in the range from about 500 kPa gauge up to about 4000 kPa gauge. These pressures relate to the operating pressure of the hose, not the burst pressure (which must be several times greater). The volumetric flow rate depends upon the fluid medium, the pressure and the inner diameter. Flowrates from 1000 m³/h up to 12000 m³/h are typical.

The hose according to the invention can also be provided for use with corrosive materials, such as strong acids, Reference is now made to the accompanying drawings, in which:

FIG. 8 is a schematic cross sectional view of an end fitting for a hose, according to the invention;

FIG. 9 is a cross sectional view of a first embodiment of a elongate reinforcing layer for use in the hose according to the invention; and FIG. 10 is a cross sectional view of a second embodiment of a elongate reinforcing layer for use in the hose according to the invention.

Figure 1:
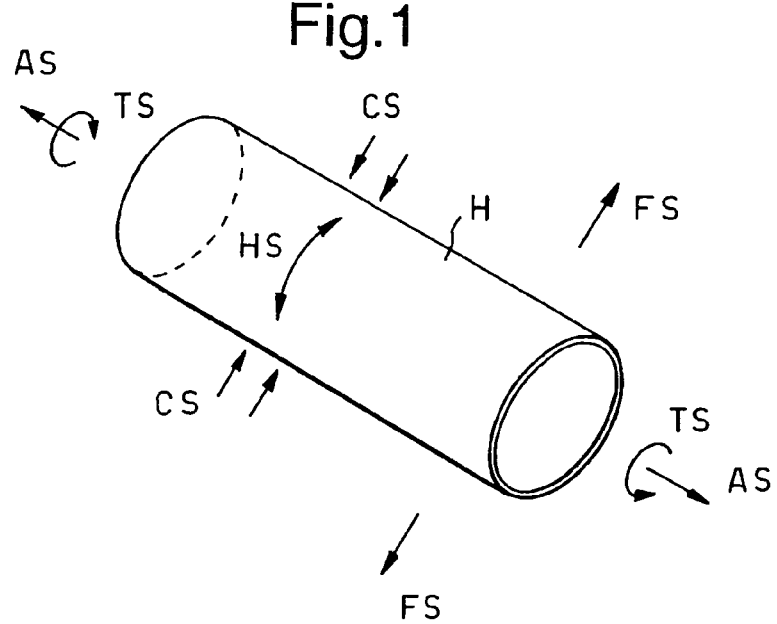
FIG. 1 is a schematic diagram showing the principle stresses to which the hose according to the invention may be subjected in operation.

FIG. 1 shows the stresses to which a hose H is normally subjected to during use. The hoop stress is designated by the arrows HS and is the stress that acts tangentially to the periphery of the hose H. The axial stress is designated by the arrows AS and is the stress which acts axially along the length of the hose H. The flexing stress is designated FS and is the stress which acts transverse to the longitudinal axis of the hose H when it is flexed. The torsional stress is designated TS and is a twisting stress which acts about the longitudinal axis of the hose. The crushing stress is designated CS and results from loads applied radially to the exterior of the hose H.

The hoop stress HS is generated by the pressure of the fluid in the hose H. The axial stress AS is generated by the pressure of the fluid in the hose and also by the combination of the weight of the fluid in the hose H and by the weight of the hose H itself. The flexing stress FS is caused by the requirement to bend the hose H in order to position it properly, and by movement of the hose H during use. The torsional stress TS is caused by twisting of the hose. Prior art hoses are generally capable of withstanding the hoop stresses HS, the flexing stresses FS and the torsional stresses TS, but is less capable of withstanding the axial stresses AS. For this reason, when prior art hoses were subjected to large axial stresses AS they generally had to be supported, to minimise the axial stresses AS.

Figure 2:
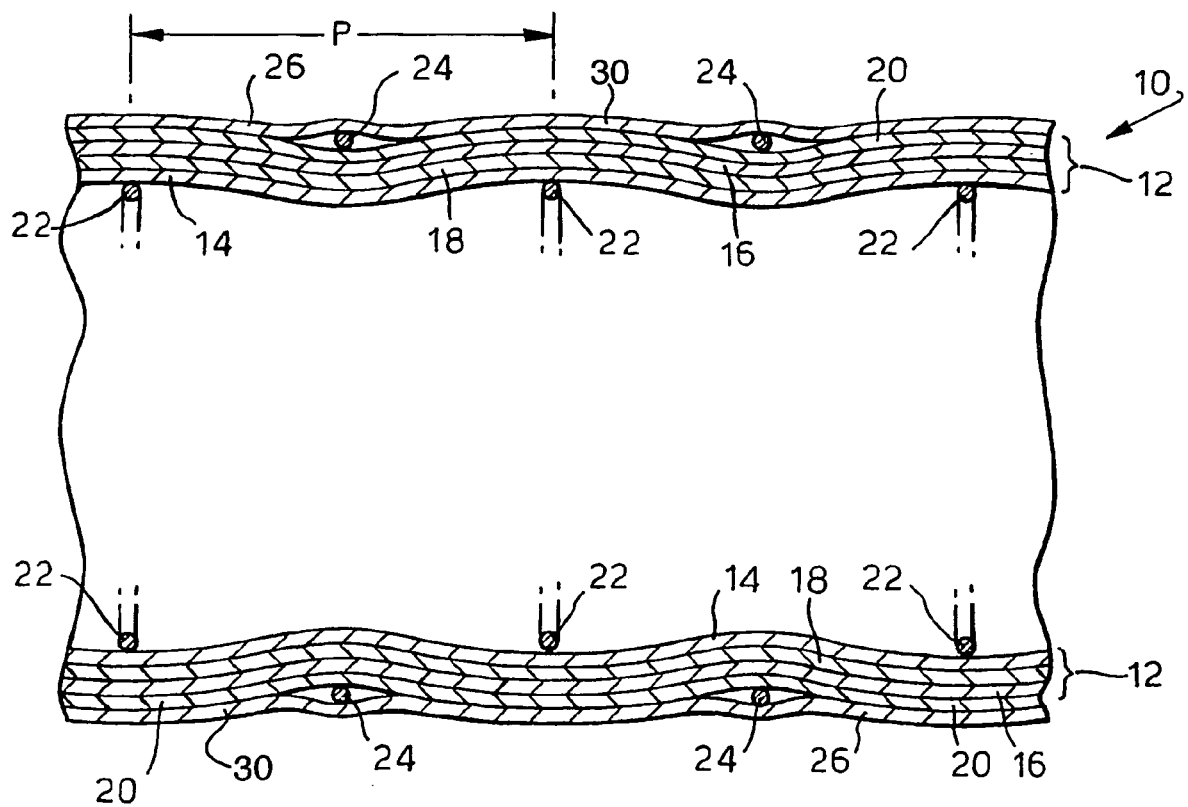
FIG. 2 is a schematic cross-sectional view of a hose according to the invention.

The problem of withstanding the axial stresses AS has been solved by the present invention. In FIG. 2 a hose in accordance with the invention is generally designated 10. In order to improve the clarity the winding of the various layers in FIG. 2, and in the other Figures, has not been shown.

The hose 10 comprises a tubular body 12 which comprises an inner reinforcing layer 14, an outer reinforcing layer 16, and a sealing layer 18 sandwiched between the layers 14 and 16. A generally tubular reinforcing braid 20, which provides axial strengthening, is disposed around the outer surface of the outer reinforcing layer 16.

The tubular body 12 and the tubular braid 20 are disposed between an inner helically coiled wire 22 and an outer helically coiled wire 24. The inner and outer wires 22 and 24 are disposed so that they are offset from one another by a distance corresponding to half the pitch length of the helix of the coils.

An insulation layer 26 is disposed around the outer wire 24. The insulation layer may be a conventional insulating material, such as a plastics foam, or may be a material described below in relation to FIG. 7.

The hose 10 further includes an elongate reinforcing layer 30 disposed around the insulation layer 26. The details of the elongate member 30 are not shown in FIG. 2, but they are shown in FIG. 9. The elongate member 30 comprises an elongate strip of material which is helically wound around the insulation layer 26.

Figure 3:
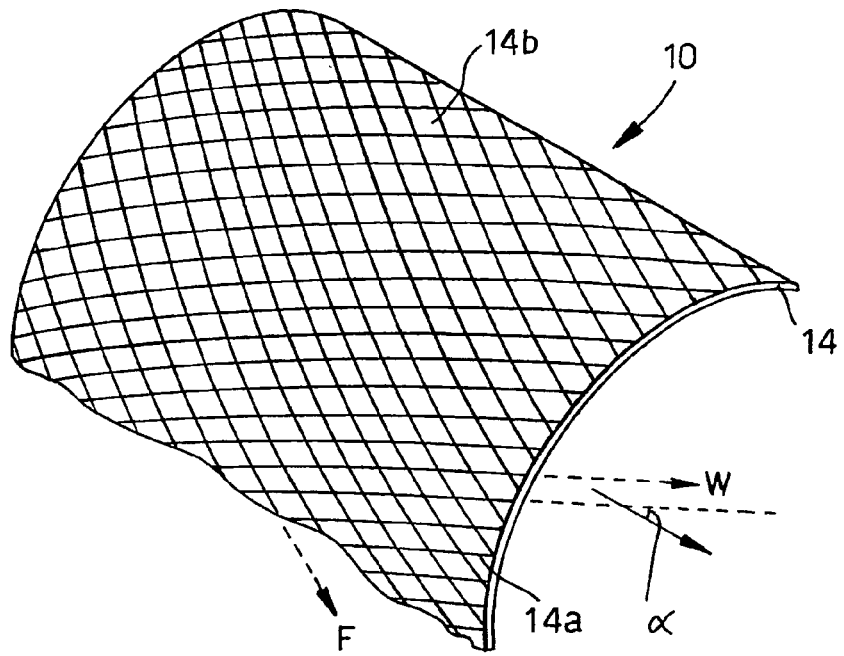
FIG. 3 is a sectional view showing the arrangement of a reinforcing layer of the hose according to the invention.

The reinforcing layers 14 and 16 comprise woven fabrics of a synthetic material, such as UHMWPE or aramid fibres. FIG. 3 illustrates the inner reinforcing layer 14, from which it will be clear that the inner reinforcing layer 14 comprises fibres 14a arranged in a warp direction W, and fibres 14b arranged in a weft direction F. In FIG. 3 only the layer 14 has been shown, in order to improve the clarity. We have unexpectedly found that the axial strength of the hose 10 can be improved by arranging the inner reinforcing layer 14 such that the warp direction W is at a low angle, of less than 15° and typically around 10° to the longitudinal axis of the hose 10. This angle is indicated by the symbol α in FIG. 3. The structure and orientation of the outer reinforcing layer 16 is substantially identical to the inner reinforcing layer 14; the angle α for the outer reinforcing layer 16 may be the same as, or different from, the angle α for the inner reinforcing layer 14.

The sealing layer 18 comprises a plurality of layers of plastics film which are wrapped around the outer surface of the inner reinforcing layer 14 to provide a fluid tight seal between the inner and outer reinforcing layers 14 and 16.

The hose 10 may also include a further reinforcing braid (not shown) disposed between the braid 20 and the outer wires 24. The further reinforcing sheath may be identical to the braid 20.

Figure 4A:
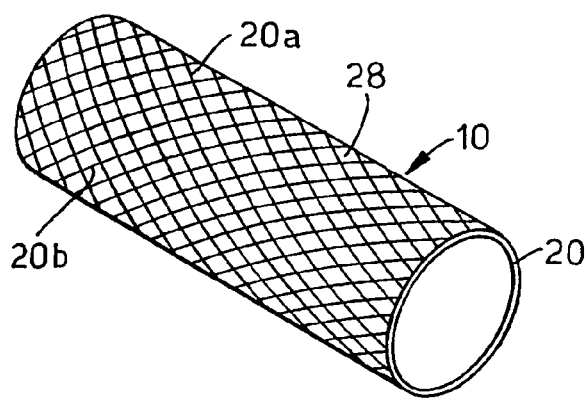
FIG. 4A is a sectional view showing the arrangement of a tubular axial strengthening sheath of the hose according to the invention, the axial strengthening sheath being in a relaxed condition.
Figure 4B:
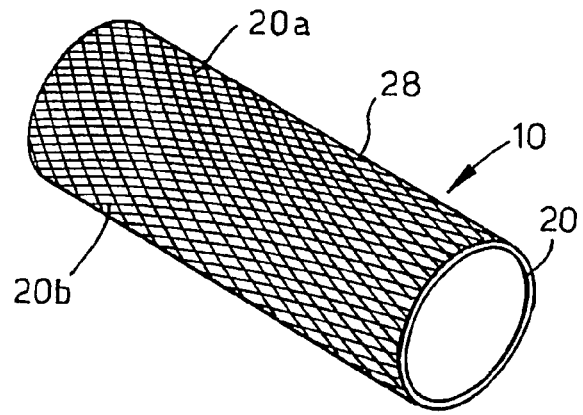
FIG. 4B is a sectional view showing the arrangement of a tubular axial strengthening sheath of the hose according to the invention, the axial strengthening sheath being in a tightened condition.

The tubular braid 20 is formed of two sets of fibres 20a and 20b which are braided to form a tubular braid. This is shown in FIGS. 4A and 4B—in these Figures only the tubular braid 20 has been shown, in order to improve the clarity. There are spaces 28 between the sets of fibres 20a and 20b, so that when the tubular braid 20 is subjected to axial tensioning the fibres 20a and 20b can contract moving into the spaces 28. This acts in a way to try to reduce the diameter of the tubular braid 20, which causes it to tighten around the tubular body 12, thereby increasing the structural integrity and burst pressure of the hose 10. FIG. 4B shows the tubular braid 20 in the tightened condition.

Figure 6:
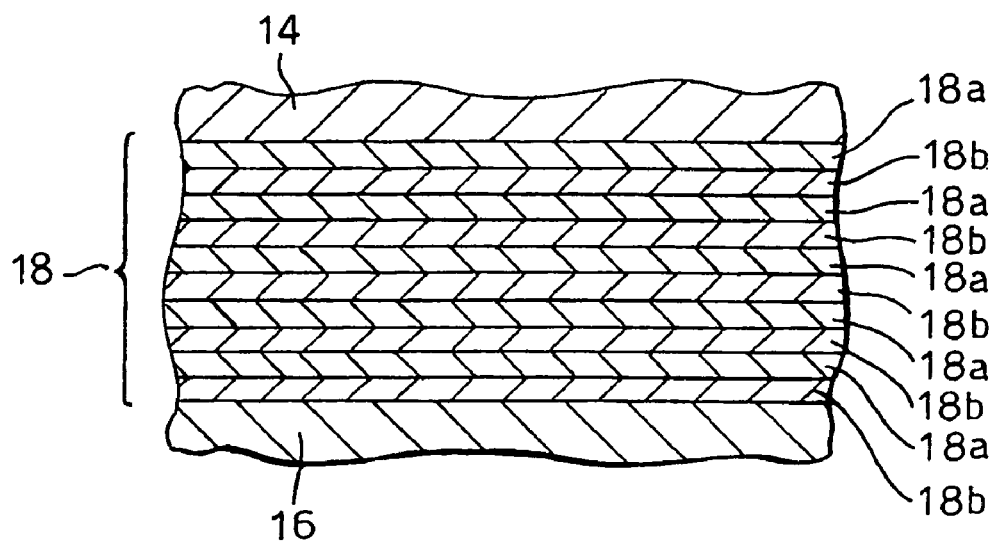
FIG. 6 is a cross-sectional view showing the a sealing layer of a hose according to the invention.

The sealing layer 18 is shown in greater detail in FIG. 6. The provision of the sealing layer 18 improves the resistance of hose to the flexing stress FS and the hoop stress HS.

As shown in FIG. 6, the sealing layer 18 comprises a plurality of layers 18a of a film made of a first polymer (such as a highly oriented UHMWPE) interleaved with a plurality of layers 18b of a film made of a second polymer (such as PFTE or FEP), the two polymers having a different stiffness. The layers 18a and 18b have been wrapped around the outer surface of the inner reinforcing layer 14 to provide a fluid tight seal between the inner and outer reinforcing layers 14 and 16. As mentioned above, the layers 18a and 18b do not necessarily have to be arranged in an alternative fashion. For example, all the layers 18a could be arranged together, and all the layers 18b could be arranged together. Furthermore, the layers do not have to be made of different materials.

Figure 7:
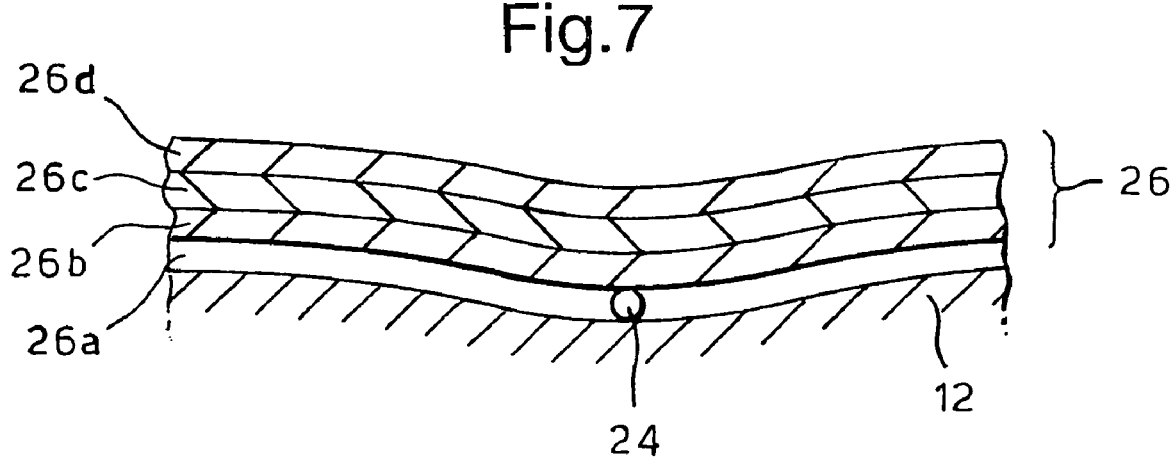
FIG. 7 is a cross-sectional view showing an insulation layer of the hose of FIG. 2; in greater detail.

The insulation layer 26 is shown in greater detail in FIG. 7. shows the insulation layer 26 in greater detail. The insulation layer is primarily concerned with improving the resistance of hose to the flexing stress FS, and with insulating the hose.

The insulation layer 26 comprises an inner layer 26a which is formed of a polyurethane which has been sprayed, poured, or otherwise applied, over the tubular body 12 and the outer wire 24. After hardening, the polyurethane layer 26a forms a solid matrix within which the outer wire 24 is embedded. This helps to keep the outer wire 24 fixed in position. In a preferred embodiment, the inner layer 26a is provided with air bubbles therein.

The insulation layer 26 includes a layer 26b over the layer 26a. The layer 26b comprises a fabric formed of basalt fibres. The layer 26b provides most of the insulating properties of the hose 10.

The insulation layer 26 further includes a layer 26c over the layer 26b. The layer 26c comprises an UHMWPE such as DYNEEMA or SPECTRA. The purpose of the layer 26c is primarily to provide strengthening against hoop and flexing stresses.

The insulation layer 26 further includes a compression layer 26d. The purpose of the compression layer 26d is to compress the layer 26b, as we have found that the insulation properties of the basalt fabric layer 26b are much improved under compression. The compression layer 26d may, for example, comprise a rope or cord which is wrapped tightly around the layer 26c. Preferably, the compression layer 26d comprises an axial strengthening sheath like the sheath 20 described above.

A further polyurethane layer (not shown) containing gas bubbles may be provided over the layer 26d to further improve the insulation properties and the buoyancy of the hose 10. A still further polyurethane layer (not shown) not containing gas bubbles may be provided over the gas-containing polyurethane layer. The further polyurethane layer could additionally, or instead, be provided within the layer 26d. It is also possible for the layer 26a itself to contain the gas bubbles.

The hose 10 can be manufactured by the following technique. As a first step the inner wire 22 is wound around a support mandrel (not shown), in order to provide a helical arrangement having a desired pitch. The diameter of the support mandrel corresponds to the desired internal diameter of the hose 10. The inner reinforcing layer 14 is then wrapped around the inner wire 22 and the support mandrel, such that warp direction W is set at the desired angle α.

A plurality of layers of the plastics films 18a, 18b making up the sealing layer 18 are then wrapped around the outer surface of the inner reinforcing layer 14. Usually, the films 18a and 18b would have a length substantially less than the length of the hose 10, so that a plurality of separate lengths of the films 18a and 18b would have to be wound around the inner layer 14. The films 18a and 18b are preferably arranged in an alternating fashion through the thickness of the sealing layer 18. Typically there might be five separate layers of the films 18a and 18b through the thickness of the sealing layer.

The outer reinforcing layer 16 is then wrapped around the sealing layer 18, such that the warp direction W is set at the desired angle (which may be α, or may be some other angle close to α). The tubular axial strengthening braid 20 is drawn over the outside of the outer reinforcing layer 16. The further braid (if required) is then wrapped around the braid 20.

The outer wire 24 is then wrapped around the further braid (or the braid 20, if the further braid is not provided), in order to provide a helical arrangement having a desired pitch. The pitch of the outer wire 24 would normally be the same as the pitch of the inner wire 22, and the position of the wire 24 would normally be such that the coils of the wire 24 are offset from the coils of the wire 22 by a distance corresponding to half a pitch length; this is illustrated in FIG. 2, where the pitch length is designated p.

A polyurethane resin is then be sprayed over the outer surface of the further braid (or the braid 20, if the further braid is not provided) to form a resin coating over the reinforcing layer 21 and the outer wire 24. The resin may then be left to harden, in order to form the layer 26a. The resin may be aerated before hardening (typically before spraying or painting) to provide gas bubbles therein. The basalt fabric layer 26b is then wrapped around the polyurethane layer 26a, and the UHMWPE layer 26c is then wrapped around the layer 26b. Finally, the compression layer 26d is applied over the layer 26c.

The ends of the hose 10 may be sealed by crimping a sleeve onto an insert inside the hose 10. This termination is generally applied after the hose 10 as been removed from the mandrel.

The ends of the hose 10 may be sealed using the end fitting 200 shown in FIG. 8. In FIG. 8, the hose 10 has not been shown, in order to improve the clarity. The end fitting 200 comprises a tubular inner member 202 having a hose end 202a and a tail end 202b. The end fitting 200 further includes a sealing member which comprises a PTFE sealing ring 204 and a stainless steel split ring 206 around the PTFE sealing ring 204.

The end fitting 200 further includes a load transferring means comprises a hose engaging member 208, a load transferring member 210 and an end member in the form of a disk-shaped plate 212. The load transferring member comprises a disk-shaped plate 214 and at least one load transferring rod 216. In FIG. 2 there are two of the rods 216, but it is possible to provide three or more of the rods 216. A tightening nut 218 is provided on each rod 216. The plates 212 and 214 have apertures 212a and 214a respectively for receiving the rods 216.

The plates 212 and 214 may each be a Simonplate, the hose engaging member 202 may be a Gedring and the split ring 206 may be an Ericring.

The plate 212 is further provided with apertures 212b, and the tail end 202b of the inner member 202 is provided with apertures 202c. Fixing bolts 220 extend through the apertures 202b and 212b to secure the plate 212 to the tail end 202a of the inner member 202. In FIG. 2, there are two fixing bolts 220 and associated apertures, but it will be appreciated that fewer, or more, fixing bolts 220 and associated apertures could be provided.

The hose engaging member 208 is provided with an inner helical recess in the form of grooves 208a which are adapted to receive the outer wire 24 of the hose 10 therein. The inner member 202 is provided with an outer helical recess in the form of grooves 202d which are adapted to receive the inner wire 22 therein. It will be seen from FIG. 2 that, like the inner and outer wires 22 and 24, the grooves 208a and 202d are spaced by half a pitch length p.

The inner member 202 is provided with two circumferential projections 202e which are located under the sealing ring 204. The projections 202e serve the improve the sealing of the tubular member 12 between the inner member 202 and the sealing ring 204, and help to prevent the tubular member from inadvertently being pulled out of position.

The hose 10 is secured to the end fitting 200 as follows. The inner member 202 is threaded into the end of the hose 10, so that the hose 10 lies close to the plate 212. The inner wire 22 is received in the grooves 202d and the outer wire 24 is received in the grooves 208a. The inner and outer wires 22 and 24 are cut back so that they do not extend along the inner member 202 beyond the grooves 202d and 208a. The insulation 26 is also cut back to this point. The inner reinforcing layer 14 is also cut back at this point, or at some point before the inner reinforcing layer 14 reaches the sealing ring 204. This means that the sealing layer 18 directly engages the outer surface of the inner member 202. The rest of the tubular body 12, however, is allowed to extend along the inner member 202 between the inner member 202 and the sealing ring 204.

The hose engaging member 208 is then tightened to cause it to clamp down on the hose 10 bring it into firm engagement with the hose 10. The nuts 218 are then tightened, which induces some axial tension in the hose 10, thereby taking up any play in the system. These forces are transmitted from the hose engaging member 208, to the plate 214, to the rod 216, to the plate 212, and to the tail end 202b of the inner member 202. The tubular member 20 is pulled back over the upper surface of the hose engaging member 208, and is secured to projections 208b extending from the upper surface of the hose engaging member 208.

The tubular body 12 extends under the sealing ring 204. After the hose engaging member 208 and the nuts 218 have been tightened, the split ring 206 is tightened in order to increase the force applied on the tubular body 12 by the sealing ring 204.

The end fitting 200 is then cooled to a low temperature by liquid nitrogen. This causes the sealing ring 204 to contract relatively more than the split ring 206, whereby the compressive force applied on the sealing ring 204 by the split ring 206 is reduced. While the split ring 206 and the sealing ring 204 are at a relatively low temperature, the split ring 206 is again tightened. The temperature is then allowed to rise to ambient conditions, whereby the compressive force on the sealing ring increases by virtue of the greater expansion of sealing ring 204 relative to the split ring 206.

This completes the end fitting for the hose 10. The hose engaging member 208 provides some sealing of the end of the hose 208, and helps to take axial forces in the hose 10 around the sealing ring 204. The sealing ring 204 provides the remainder of the sealing of the hose 10.

Figure 5A:
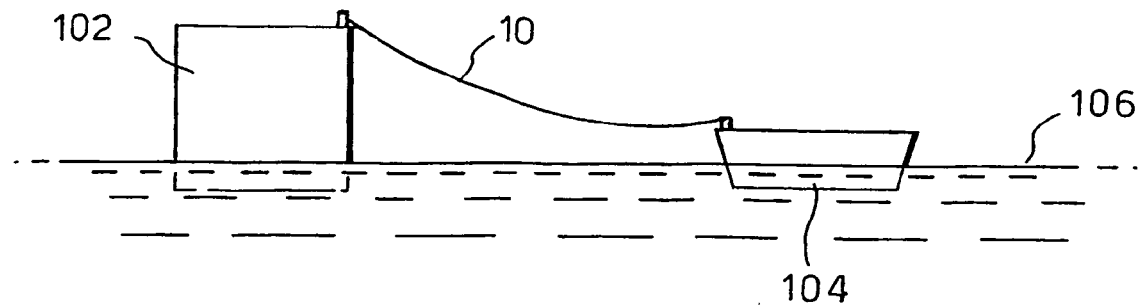
FIGS. 5A, 5B, 5C and 5D show four applications of hose according to the present invention.
Figure 5B:
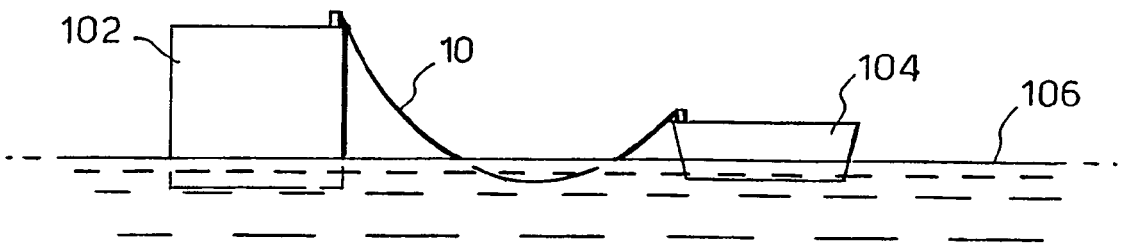
Figure 5C:
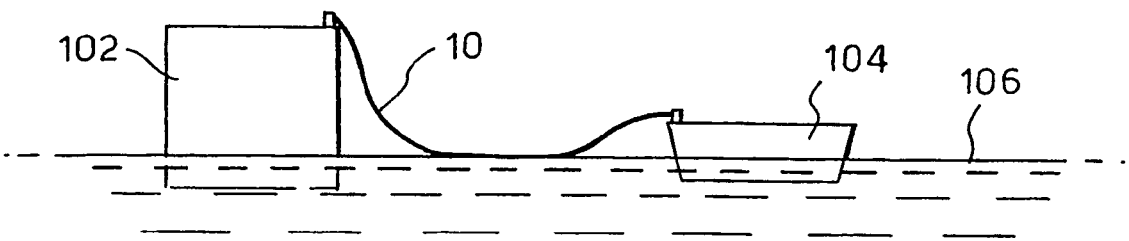
Figure 5D:
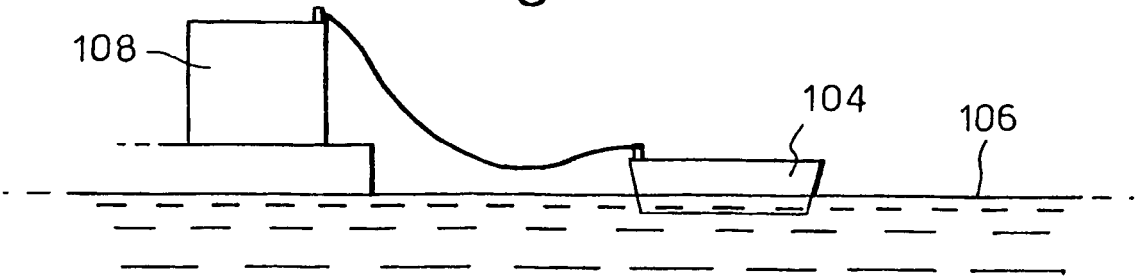

FIGS. 5A to 5D show three applications for the hose 10. In each of FIGS. 5A to 5C a floating production, storage and offloading vessel (FPSO) 102 is linked to a LNG carrier 104 by means of a hose 10 according to the invention. The hose 10 carries LNG from a storage tank of the FPSO 102 to a storage tank of the LNG carrier 104. In FIG. 5A, the hose 10 lies above the sea level 106. In FIG. 5B, the hose 10 is submerged below the sea level 106. In FIG. 5C, the hose 10 floats near the surface of the sea. In each case the hose 10 carries the LNG without any intermediate support. In FIG. 5D the LNG carrier is linked to a land-based storage facility 108 via the hose 10.

The hose 10 may be used for many other applications apart from the applications shown in FIGS. 5A to 5C. The hose may be used in cryogenic and non-cryogenic conditions.

Reference is now made to FIG. 9 which shows a cross-sectional view of one embodiment of the elongate reinforcing layer 30. The layer 30 comprises a continuous profile 32 which contains two longitudinally extending buoyancy chambers 34. The profile 32 has opposing longitudinal edges 36 and 38. A longitudinally extending interlocking formation 40 and 42 is integral with a respective edge 36, 38. Each formation 40 and 42 is provided with a respective retaining member 44 and 46.

The formations 40 and 42 are arranged in opposite directions, so that, when the layer 30 is helically wound around the rest of the hose 10, the formations 40 and 42 can interengage, as shown in FIG. 9. The retaining members 44 and 46 prevent the formations 40 and 42 from becoming disengaged.

It will be appreciated that the invention described above may be modified. For example, the tubular sheath 20 could be located outside the outer wire 24. Also, the hose 10 may include additional reinforcing layers 14, 18, sealing layers 16 and/or tubular sheaths 20. One or more of, or even all of, the sealing layers 18a may be a polymer coated metallic film, or metallised polymer film. Similarly, one or more of, or even all of, the sealing layers 18b may be a polymer coated metallic film or metallised polymer film.

Reference is now made to FIG. 10 which shows a cross-sectional view of another embodiment of the elongate reinforcing layer 30, which has been designated 130. The layer 130 comprises a continuous profile 132. The profile 32 has opposing longitudinal edges 136 and 138. A longitudinally extending interengaging formation 140 and 142 is integral with a respective edge 136, 138. Each formation 140 and 142 comprises a contoured profile having projections 140a and 142a and recesses 140b and 142b, such that the projections 140a can be received in, and interengage with, the recesses 142b, and the projections 142a can be received in, and interengage with, the recesses 140b. The configuration is such that when the projections and recesses are interengaged, there is no space between the formations 140 and 142.

The formations 140 and 142 are arranged to face in opposite directions, so that, when the layer 130 is helically wound around the rest of the hose 10, the formations 140 and 142 can interengage. The formations 140 and 142 may be secured together by any convenient bonding means.

The profile 132 has a corrugated shape which makes it easier for the member 130 to accommodate bending forces.

It will be appreciated that the invention described above may be modified. For example, the tubular sheath 20 could be located outside the outer wire 24. Also, the hose 10 may include additional reinforcing layers 14, 18, sealing layers 16 and/or tubular sheaths 20. One or more of, or even all of, the sealing layers 18a may be a polymer coated metallic film, or metallised polymer film. Similarly, one or more of, or even all of, the sealing layers 18b may be a polymer coated metallic film or metallised polymer film.

It will be appreciated that the invention described above may be modified.

The invention claimed is:

1. A hose comprising a tubular body of flexible material arranged between inner and outer gripping members, wherein the hose further comprises an elongate member having opposing longitudinal edges, the elongate member being helically wound around the tubular body such that the opposing longitudinal edges of the elongate member are in an adjacent or overlapping arrangement, wherein each longitudinal edge includes a formation capable of interengaging with a cooperating formation on the opposing longitudinal edge.

2. A hose according to claim 1, wherein the interengaging formations are arranged so that, when interengaging, they provide a continuous waterproof seal.

3. A hose according to claim 1, wherein the interengaging formations extend substantially continuously along the respective edges.

4. A hose according to claim 1, wherein each interengaging formation comprises an interengaging profile arranged along the edge which is shaped to interengage with the corresponding formation on the opposing edge.

5. A hose according to claim 4, wherein the profiles are such that when the elongate member is being wound around the tubular body, the formation of one of the edges can be pushed into interengaging engagement with the formation of the opposing edge.

6. A hose according to claim 1, wherein each interengaging formation comprises an interlocking formation, capable of locking the formations together once they have been brought together.

7. A hose according to claim 6, wherein each interlocking formation is configured to provide a push-fit or a snap fit with the corresponding interlocking formation of the opposing longitudinal edge.

8. A hose according to claim 6, wherein the interlocking formations are C-shaped, with the interlocking formation on the opposing edge portions being oriented in an opposite direction, whereby the C-shaped formations can interlock when the elongate member is wound around the tubular body.

9. A hose according to claim 6, wherein the interlocking formation of each longitudinal edge includes a retaining member adapted to cooperate with a corresponding retaining member on the interlocking formation of the opposing longitudinal edge, whereby the interlocking formations are retained in an interlocking relationship by the retaining members.

10. A hose according to claim 9, wherein the retaining member comprises an inwardly directed flange arranged at or near one of the ends of the interlocking formation.

11. A hose according to claim 1, wherein each interengaging formation comprises a plurality of projections and recesses, the projections and recesses of one formation being adapted to interengage with the recesses and projections respectively of the formations on the opposing longitudinal edge.

12. A hose according to claim 1, wherein elongate member includes at least one closed chamber, the or each chamber has a density lower than that of the rest of the elongate member.

13. A hose according to claim 1, wherein the elongate member includes at least one closed chamber, the or each chamber containing a gas.

14. A hose according to claim 1, wherein the elongate member includes at least one closed chamber, the or each chamber a foam or aerated polymer.

15. A hose according to claim 12, wherein there are two adjacent chambers both running longitudinally along substantially the entire length of the elongate member.

16. A hose according to claim 12, wherein there are a plurality of closed chambers disposed in the elongate member in such a manner as to form a sponge-like structure.

17. A hose according to claim 1, wherein the elongate member has a thickness greater than the distance between the longitudinal edges.

18. A hose according to claim 1, wherein the inner and/or the outer gripping member is/are provided with an oval or a semi-circular cross-section.

19. A hose according to claim 1, wherein the elongate member is corrugated in a direction extending between the longitudinal edges.

20. A hose comprising a tubular body of flexible material arranged between inner and outer gripping members, wherein the hose further comprises an elongate member having opposing longitudinal edges, the elongate member being helically wound around the tubular body such that the opposing longitudinal edges of the layer are in an adjacent or overlapping arrangement, wherein the elongate member has at least one buoyancy chamber therein.

* * * * *